US006822230B2

(12) United States Patent
Schleifer et al.

(10) Patent No.: US 6,822,230 B2
(45) Date of Patent: Nov. 23, 2004

(54) MATRIX-ASSISTED LASER DESORPTION/ IONIZATION SAMPLE HOLDERS AND METHODS OF USING THE SAME

(75) Inventors: Arthur Schleifer, Portola Valley, CA (US); Viorica Lopez-Avila, Cupertino, CA (US); Magdalena Anna Ostrowski, Santa Clara, CA (US); Jean Luc Truche, Los Altos, CA (US); Jian Bai, Sunnyvale, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 21 days.

(21) Appl. No.: 10/328,733

(22) Filed: Dec. 23, 2002

(65) Prior Publication Data

US 2004/0119013 A1 Jun. 24, 2004

(51) Int. Cl.[7] .......................... H01J 49/26; B01D 59/44

(52) U.S. Cl. ........................ 250/288; 250/281; 250/282

(58) Field of Search ................................ 250/288, 281, 250/282

(56) References Cited

U.S. PATENT DOCUMENTS

| | | | |
|---|---|---|---|
| 5,498,545 A | | 3/1996 | Vestal |
| 5,643,800 A | | 7/1997 | Tarantino et al. |
| 5,777,324 A | | 7/1998 | Hillenkamp |
| 5,777,860 A | | 7/1998 | Halbert |
| 5,808,300 A | * | 9/1998 | Caprioli ...................... 250/288 |
| 5,828,063 A | | 10/1998 | Koster et al. |
| 5,841,136 A | | 11/1998 | Holle et al. |
| 6,111,251 A | | 8/2000 | Hillenkamp |
| 6,287,872 B1 | | 9/2001 | Schurenberg et al. |
| 6,414,306 B1 | | 7/2002 | Mayer-Posner et al. |
| 6,423,966 B2 | | 7/2002 | Hillenhamp et al. |

FOREIGN PATENT DOCUMENTS

| | | |
|---|---|---|
| EP | 0964427 A2 | 12/1999 |
| GB | 2312782 A | 11/1997 |
| GB | 2332273 A | 6/1999 |
| GB | 2370114 A | 6/2002 |
| WO | WO99/63576 | 12/1999 |

OTHER PUBLICATIONS

US 2002/0031773 A1, Patent Application Publication for Ammon, Jr. Publication date Mar. 14, 2002.

Daltonics, Scout MTP MALDI, entitled “Sample Targets for Ultra–Sensitive Automated MALDI MS,” by Bruker Daltonics.

Mark E. McComb et al., entitled “Characterization of Hemoglobin Variants by MALDI–TOF MS Using a Polyurenthane Membrane as the Sample Support,” Analytical Chemistry, vol. 70, No. 24, Dec. 15, 1998, pp. 5142–5149.

* cited by examiner

*Primary Examiner*—Nikita Wells

(57) ABSTRACT

MALDI sample holders and methods of using and making the same are provided. The MALDI sample holders are configured for use in matrix assisted laser desorption/ ionization and include a planar substrate having a surface and at least one fluid retaining structure present on the surface. The fluid retaining structure includes a material that changes from a first fluid state to a second solid state in response to a stimulus. Also provided are methods of using the subject MALDI sample holders in a matrix-assisted laser desorption/ionization protocol, as well as methods of producing the subject MALDI sample holders. Kits for use in practicing the subject methods are also provided.

37 Claims, 9 Drawing Sheets

2 fmol / No Fluid Retaining Structure 5 fmol / No Fluid Retaining Structure

Matrix Only / Fluid Retaining Structure 2 fmol / Fluid Retaining Structure 5 fmol / Fluid Retaining Structure

MATRIX-ASSISTED LASER DESORPTION/ IONIZATION SAMPLE HOLDERS AND METHODS OF USING THE SAME

FIELD OF THE INVENTION

The field of this invention is analytical instruments, particularly matrix-assisted laser desorption/ionization ("MALDI") instruments.

BACKGROUND OF THE INVENTION

Matrix-assisted laser desorption/ionization ("MALDI") is a process of ionizing analytes in a sample in a manner that allows the ionized analytes to be further studied. During the past decade, MALDI has proven to be a valuable tool in the analysis of molecules, e.g., biomolecules or biosubstances, and especially large molecules and has application in a wide variety of fields such as genomics, proteomics and the like. Accordingly, a number of MALDI devices have been developed for performing MALDI on an analyte of interest, where in certain instances these MALDI devices are coupled to or otherwise integrated with a device for studying the MALDI ionized analyte, e.g., mass spectrometers. Mass spectrometers are instruments that measure and analyze ions by their mass and charge. For the most part, time-of-flight mass spectrometers ("TOF-MS") are used for this purpose, but other mass spectrometers may be used as well, such as ion cyclotron resonance spectrometers (Fourier transform ion cyclotron mass resonance) and high-frequency quadrupole ion trap mass spectrometers.

Generally, MALDI is a method that enables vaporization and ionization of non-volatile biological analytes from a solid phase directly into a gas phase. To accomplish this task, the analyte of interest is suspended or dissolved in a matrix that generally is a small organic compound that co-crystallizes with the analyte. A sample containing the analyte/matrix mixture is then applied to a suitable support, e.g., a sample probe or sample plate, which is then loaded into device for performing MALDI. It is theorized that the presence of the matrix enables the analyte to be ionized without being degraded, a problem of other analogous methods. Accordingly, MALDI enables the detection of intact molecules as large as 1 million Daltons.

A laser beam serves as the desorption and ionization source in MALDI and, as such, once the substrate supported sample is properly loaded into the MALDI device, a laser is used to vaporize the analyte. In the vaporization process, the matrix absorbs some of the laser light energy causing part of the illuminated matrix to vaporize. The resultant vapor cloud of matrix carries some of the analyte with it so that the analyte may be analyzed. As such, the matrix molecules absorb most of the incident laser energy, thus minimizing analyte damage and ion fragmentation.

Once the molecules of the analyte are vaporized and ionized, they may be analyzed. As mentioned above, this may be accomplished by the use of a mass spectrometer. Accordingly, the vaporized ions are transferred electrostatically into a mass analyzer where they are separated from the matrix ions, for example a TOF-MS flight tube. Following separation of the ions, the ions are then directed to a detector so that the ions may be individually detected. Depending on the nature of the analyzer and how it separates the ions, mass spectrometers fall into different categories. In the case of a TOF-MS for example, separation and detection is based on the mass-to-charge (m/z) ratios of the ions. As such, detection of the ions at the end of the time-of-flight tube is based on their flight time, which is proportional to the square root of their m/z.

When designing effective MALDI methods, attention must be given to the support upon which a sample of the matrix/analyte mixture is applied so that it can be inserted into an appropriate MALDI device. These supports may range from single sample supports to multi-sample supports similar to conventional microtiter plates. Regardless of the number of samples accommodated by the support, the procedure for applying a sample to the support is generally the same. In depositing a sample for analysis onto a sample support, the sample must be deposited at a specific position on the supports where in many embodiments it is dried. This specific position corresponds to the position of the laser beam and also provides a unique address for the sample such that identification of a particular sample, amongst multiple samples analyzed, is possible.

It will be apparent that for MALDI protocols it is important to be able to position the sample at a particular area of the support with a high degree of precision and accuracy so that the sample is not only positioned in the correct position, but also so that there is no cross-contamination between samples if more than one sample is present on a substrate, i.e., the sample is retained at the particular position. Without visual aids, it is difficult, particularly for manually deposited samples, to precisely and accurately position the small volumes of sample required, even with the use of a pipette. Furthermore, even if a sample is precisely positioned on a support, the sample may spread or wick out of the area and could contaminate the other samples, if present, or deplete the amount of sample in the intended area that is to be interrogated by the MALDI laser to a level that may be below the minimum volume requirements for MALDI.

Prior solutions intended to provide discrete positions at which to deposit a sample for MALDI have thus far not provided complete solutions. For example, supports having surfaces with scribed patterns (laser etched, chemically etched, and the like) have been developed. However, while laser scribed surfaces may provide visual clues to a particular location of a support, these laser scribed patterns usually do not effectively contain the sample in the location and thus the sample may still spread about the support surface and in fact may even facilitate wicking the sample out of the designated support location. The problems associated with laser scribed surfaces are only exacerbated by the use of large sample volumes.

Patterning the support surface, e.g., with a hydrophobic/hydrophilic treatment or the like, has also been attempted. These patterns, such as hydrophobic/hydrophilic patterns, are surface treatments that are typically a film or a chemically modified monolayer on the support surface. While these patterns may contain a sample to a specific area of the support once the sample is deposited thereto, they are difficult, if not impossible, to see with the naked human eye and thus usually do not provide a visual reference to aid in depositing a sample at a particular support location. Furthermore, these patterned areas usually have a sample volume limit such that once this limit is exceed, the sample spreads out of the designated area thus depleting the sample volume for analysis and/or contaminating other samples, if present.

As such, there continues to be an interest in the development of supports or sample holders suitable for use in MALDI protocols. Of particular interest are supports that provide visual references or guides to designated areas on the support, effectively contain a sample in a designated area, are cost effective and easy to manufacture, arc able to accommodate a wide range of sample volumes, do not adversely affect the desorption/ionization of the sample, and which may be provided in a wide variety of configurations including single sample supports, as well as multiple sample supports that are able to accommodate a plurality of samples without cross-contamination.

Relevant Literature

References of interest include: International Publication Nos.: WO 99/63576; GB 2,312782 A; GB 2,332,273 A; GB 2,370114A; and EP 0964427 A2, as well as in U.S. Patent Publication No. 2002031773; and U.S. Pat. Nos.: 5,498,545; 5,643,800; 5,777,324; 5,777,860; 5,828,063; 5,841,136; 6,111,251; 6,287,872; 6,414,306; and 6,423,966; the disclosures of which are herein incorporated by reference.

SUMMARY OF THE INVENTION

MALDI sample holders and methods of using and making the same are provided. The MALDI sample holders are configured for use in matrix assisted laser desorption/ionization and include a planar substrate having a surface and at least one fluid retaining structure present on the surface. The fluid retaining structure includes a material that changes from a first fluid state to a second solid state in response to a stimulus. Also provided arc methods of using the subject MALDI sample holders in a matrix-assisted laser desorption/ionization protocol that include providing a subject MALDI sample holder, depositing a sample into at least one fluid retaining structure of the MALDI sample holder, inserting the MALDI sample holder into a matrix assisted laser desorption/ionization device and performing matrix assisted laser desorption/ionization. The subject invention also includes methods of producing the subject MALDI sample holders that include providing a planar substrate having a surface and providing a material in first fluid state. In the subject methods, the material is positioned on the substrate surface and a stimulus is applied to the material to change it to a second solid state. The stimulus may be applied either before or after the material is positioned on the substrate surface. Also provided are kits for use in practicing the subject methods.

BRIEF DESCRIPTIONS OF THE DRAWINGS

DETAILED DESCRIPTION OF THE INVENTION

Figure 1:
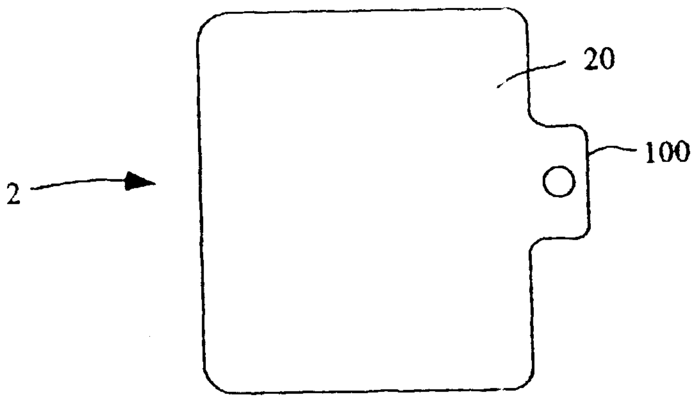
FIG. 1 shows an exemplary embodiment of a subject substrate that may be used with the subject MALDI sample holders.

MALDI sample holders and methods of using and making the same are provided. The MALDI sample holders are configured for use in matrix assisted laser desorption/ionization and include a planar substrate having a surface and at least one fluid retaining structure present on the surface. The fluid retaining structure includes a material that changes from a first fluid state to a second solid state in response to a stimulus. Also provided are methods of using the subject MALDI sample holders in a matrix-assisted laser desorption/ionization protocol that include providing a subject MALDI sample holder, depositing a sample into at least one fluid retaining structure of the MALDI sample holder, inserting the MALDI sample holder into a matrix assisted laser desorption/ionization device and performing matrix assisted laser desorption/ionization. The subject invention also includes methods of producing the subject MALDI sample holders that include providing a planar substrate having a surface and providing a material in first fluid state. In the subject methods, the material is positioned on the substrate surface and a stimulus is applied to the material to change it to a second solid state. The stimulus may be applied either before or after the material is positioned on the substrate surface. Also provided are kits for use in practicing the subject methods.

Before the present invention is described, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range is encompassed within the invention. The upper and lower limits of these smaller ranges may independently be included in the smaller ranges is also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the preferred methods and materials are now described. All publications mentioned herein are incorporated herein by reference to disclose and describe the methods and/or materials in connection with which the publications are cited.

It must be noted that as used herein and in the appended claims, the singular forms "a", "an", and "the" include plural referents unless the context clearly dictates otherwise.

The publications discussed herein are provided solely for their disclosure prior to the filing date of the present application. Nothing herein is to be construed as an admission that the present invention is not entitled to antedate such publication by virtue of prior invention. Further, the dates of publication provided may be different from the actual publication dates which may need to be independently confirmed.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention.

As summarized above, the subject invention provides MALDI sample holders for use in a MALDI protocol and more specifically MALDI sample holders that support one or more samples for use in a MALDI protocol. Accordingly, the subject invention may be employed in a wide variety of MALDI protocols for use in a wide variety of applications and thus is not limited to any particular MALDI protocol or application described herein, where examples of MALDI protocols suitable for use with the subject invention include vacuum MALDI protocols and atmospheric pressure ("AP") MALDI protocols (reflection and transmission geometry). Such MALDI protocols are the basis for many of the methods and devices used in a variety of different fields, e.g., genomics (e.g., in sequencing, SNP detection, nucleic acid amplification, differential gene expression analysis, identification of novel genes, gene mapping, finger printing, etc.), proteomics, identification and characterization of microorganisms such as bacteria, etc. In further describing the subject invention, the subject MALDI sample holders will be described in greater detail, followed by a description of methods that employ the subject MALDI sample holders. Finally, kits for use in practicing the subject methods is described.

MALDI Sample Holders

As summarized above, the subject MALDI sample holders are capable of effectively retaining one or more samples for use in a MALDI protocol and thus are suitably configured to be used in a MALDI protocol. Accordingly, as will be described in greater detail below, the subject MALDI sample holders are of suitable dimensions, shapes and materials for use with a MALDI protocol. In general, the subject MALDI sample holders include a substrate having at least one planar substrate surface, upon which is positioned at least one fluid retaining structure. In accordance with the subject invention, each subject fluid retaining structure is capable of holding and effectively retaining a fluid sample for use in a MALDI protocol such that the retained sample is not able to spread or otherwise diffuse away from or out of the retaining structure. Accordingly, the subject invention minimizes or eliminates the "coffee ring effect". This coffee ring effect results if fluid is not sufficiently contained in an area and thus a coffee ring effect results when the fluid dries out. The coffee ring effect produces a drying pattern of material that resembles a ring of coffee from the bottom of a coffee cup such that the outside edge of the ring has the dried material concentrated at a higher concentration than other areas of the ring, i.e., a higher concentration of material is present at the outside edge or perimeter of the ring and a lesser or a decreased concentration of material, relative to the outside edge of the ring, is present towards the middle of the area. The subject retaining structures also enable a larger volume of liquid sample to be appropriately positioned on a substrate surface compared to a substrate surface without the subject fluid retaining structures. This larger volume of fluid enables a higher concentration of sample to be retained within the fluid retaining structure than would otherwise be possible.

The subject fluid retaining structures are also configured to provide an effective guide or visual clue or reference point for the fluid retaining structures so that the fluid retaining structures may be easily located, e.g., by an individual or automated instrument, for fluid deposition thereinto. In certain embodiments, a plurality of fluid retaining structures is present on a substrate surface. In this manner, a plurality of samples may be retained for use in a MALDI protocol without cross-contamination.

Figure 9:
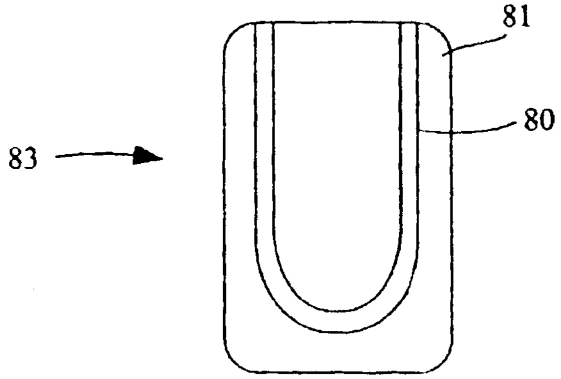
FIG. 9 shows an exemplary embodiment of a subject MALDI sample holder having a fluid retaining structure in the form of a channel.

In certain embodiments, in addition to or instead of one or more discrete fluid retaining structures, a fluid retaining structure may be provided in the form of continuous channel or a plurality of channels. In this manner, a sample stream, e.g., liquid chromatography effluent, may be deposited on the MALDI substrate and retained by the channel(s) for analysis (see for example FIG. 9 which shows an exemplary embodiment of a subject MALDI sample holder 83 having a continuous fluid retaining structure channel 80 on substrate 81).

The substrates of the subject invention may assume a variety of shapes and sizes, with the only limitation being that they are configured to be used in a MALDI protocol, e.g., capable of being inserted into a MALDI device so that MALDI can be performed on the sample(s) being supported thereby. Generally, these substrates are substantially planar substrates having at least one fluid retaining surface or rather at least one surface upon which fluid may be retained. However, while the substrates are typically substantially planar, in certain embodiments the substrates may have more complex structures, e.g., may be substantially non-planar, including non-planar, and may include one or more of recessed structures, elevated structures, channels, orifices, guides, etc. The subject substrates may be rigid or flexible. By "rigid" it is meant that the substrate cannot be substantially bent or folded without breaking. By "flexible" it is meant the substrate, if flexible, may be substantially bent or folded without breaking, tearing, ripping, etc.

Figure 2:
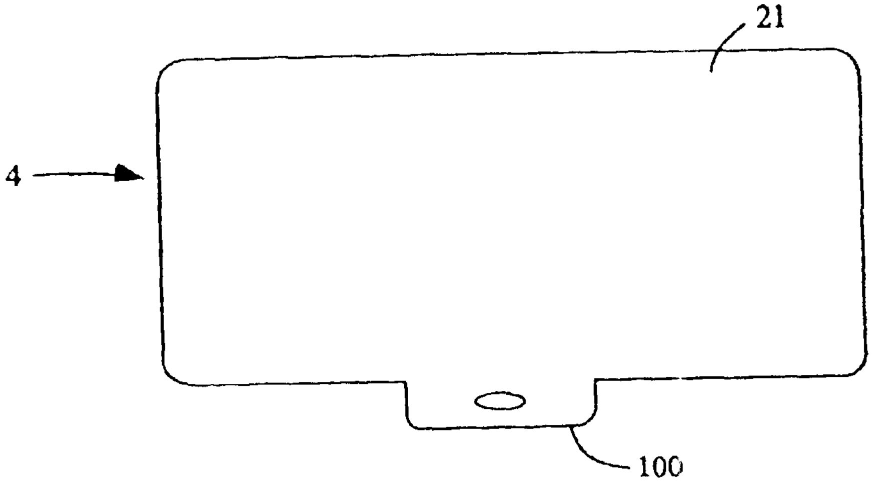
FIG. 2 shows another exemplary embodiment of a subject substrate that may be used with the subject MALDI sample holders.
Figure 3:
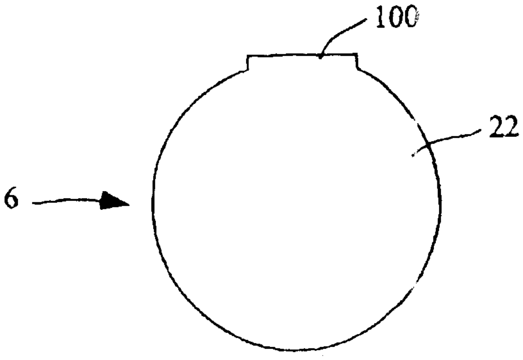
FIG. 3 shows another exemplary embodiment of a subject substrate that may be used with the subject MALDI sample holders.

The particular shape of a subject substrate is usually dictated at least in part by the MALDI device with which it is used such that the shape of the substrate is one which corresponds or "fits" with the MALDI device, e.g., is able to be accommodated in a MALDI device receiving area. Accordingly, the shapes of these substrates range from simple to complex. In many embodiments, the substrates will assume a square, rectangular, oblong, oval or circular shape, as shown in the exemplary embodiments of substrate 2 (having at least one fluid retaining surface 20) of FIG. 1, substrate 4 (having at least one fluid retaining surface 21) of FIG. 2, and substrate 6 (having at least one fluid retaining surface 22) of FIG. 3. Shapes other than those shown herein are of course possible as well, such as other geometric shapes and irregular or complex shapes. In certain embodiments, the substrates may include an optional user engagement portion 100, e.g., a handle or the like for ease of handling and transport to and from (e.g., into and out of) a MALDI device.

Likewise, the size of the subject substrates may vary depending on a variety of factors, including, but not limited to, the number of fluid retaining structures present thereon, the particular MALDI device with which it is to be used, etc. Generally, the subject substrates are sized to be easily transportable or moveable. For example, in certain embodiments of the subject devices having a substantially rectangular shape, the length of a substrate typically ranges from about 1 mm to about 30 nm, usually from about 1.5 mm to about 10 mm and more usually from about 1.0 mm to about 5 mm, the width typically ranges from about 0.25 mm to about 10 mm, usually from about 0.5 mm to about 8 mm, more usually from about 0.5 mm to about 4 mm and the thickness typically ranges from about 0.25 mm to about 10 mm, usually from about 0.75 mm to about 5 mm and more usually from about 0.85 mm to about 1.25 mm. Substrates having circular or other round-like shapes may have analogous dimensions. These dimensions are exemplary only and may vary as appropriate.

Substrate materials provide physical support for one or more fluid retaining structures positioned on at least one surface thereof and are configured to endure the conditions of any treatment or handling or processing that may be encountered in the use of the substrate. As mentioned above, a feature of the subject invention is that the subject substrates are configured to be used in a MALDI protocol. As such, the substrates of the subject invention are robust enough to withstand the MALDI protocol with which it is subjected, e.g., the substrates arc stable enough to withstand the rigors of a MALDI protocol. Specifically, the materials of the substrates are typically substantially chemically and physically stable under conditions employed for the MALDI protocol at hand. For example, the substrates may be substantially chemically and/or physically inert to the sample contacted thereto and/or thermally stable and/or substantially stable to withstand the ionization process (e.g., substantially stable with respect to the laser energy employed, etc.). By "substantially inert" and "substantially stable" it is meant that the substrates do not adversely affect or interfere with the MALDI procedure, e.g., with the matrix and/or analyte that is under investigation. For example, certain MALDI protocols involve the use of a vacuum which facilitates the mobility of the ions produced by MALDI. Accordingly, in such embodiments the substrate employed is one that is vacuum compatible. As will be described below, in many embodiments the substrate includes a metal or metal alloy. Accordingly, in such embodiments the metal or metal alloy employed is one that does not contribute metal ions to the ionization of the analyte during ion formation in a MALDI protocol.

Suitable substrates may derive from naturally occurring materials, naturally occurring materials that have been synthetically modified, or synthetic materials. Generally, the substrates are electrically conductive, e.g., made entirely of an electrically conductive material or coated or layered with an electrically conductive material, etc. In many embodiments, at least a portion of the substrate is hydrophobic, where it may be inherently hydrophobic or may be made to be hydrophobic, e.g., by a hydrophobic agent, chemical manipulation, etc. By "hydrophobic" it is meant that at least a portion of a surface of substrate is substantially if not completely unwettable and substantially if not completely liquid repellant for the sample contacted thereto, even if the sample is not an aqueous solution. For example, in the case of an oily-based sample, it should therefore correspondingly be a lipophobic surface. In certain embodiments, at least a portion of a subject substrate is hydrophilic, where the material of the subject substrate may be inherently hydrophilic or be made hydrophilic, e.g., by a hydrophilic agent, chemical manipulation, etc. By "hydrophilic" it is meant that at least a portion of a surface of a subject substrate is easily wettable for the type of sample contacted thereto, even if the sample is not an aqueous solution. In certain embodiments, a substrate surface may have one or more areas that are hydrophobic and one or more areas that are hydrophilic.

It is to be understood that one or more materials may be used to fabricate the subject substrates such that a plurality of materials may be employed. Examples of materials which may be used to fabricate the subject substrates include, but are not limited to, metals such as stainless steel, aluminum, and alloys thereof, polymers, e.g., plastics and other polymeric materials such as poly (vinylidene fluoride), poly (ethyleneterephthalate), polyurethane, e.g., nonporous polyurethane, fluoropolymers such as polytetrafluoroethylene (e.g., Teflon®), polypropylene, polystyrene, polycarhonate, PVC, nylon, and blends thereof; siliceous materials, e.g., glasses, fused silica, ceramics and the like. Substrates may also be made entirely or made in part of porous silicon (desorption/ionization on silicon or DIOS), see for example Wei et al. Desorption/Ionization Mass Spectrometry on Porous Silicon, Nature 1999, 399 (6733), 243–246. Direct desporption/ionization without matrix has been performed using porous silicon as a substrate. DIOS uses porous silicon to trap analytes deposited on the surface and laser radiation to vaporize and ionize these molecules. DIOS has been demonstrated for biomolecules at the femtomole and attomole levels. As such, by positioning the subject fluid retaining structures on a porous silicon surface, smaller biomolecules, e.g., m.w.<500 Da, may be analyzed in accordance with the subject invention. As will be apparent to those of skill in the art, the subject MALDI sample holders may be manufactured to be re-useable or single use.

The substrates of the invention may also be fabricated from a "composite," i.e., a composition made up of unlike materials. The composite may be a block composite, e.g., an A-B-A block composite, an A-B-C block composite, or the like. Alternatively, the composite may be a heterogeneous combination of materials, i.e., in which the materials are distinct from separate phases, or a homogeneous combination of unlike materials. As used herein, the term "composite" is used to include a "laminate" composite. A "laminate" refers to a composite material formed from several different bonded layers of identical or different materials.

The subject substrates may be fabricated using any convenient method, including, but not limited to, molding and casting techniques, embossing methods, surface machining techniques, bulk machining techniques, and stamping methods.

As mentioned above, at least one fluid retaining structure is present on at least one surface of the substrate. A feature of the subject invention is that the one or more fluid retaining structures present on a substrate surface includes a material that changes from a first fluid state to a second solid state in response to a stimulus. Furthermore, the fluid retaining structures are configured to withstand a MALDI protocol, e.g., substantially stable, substantially inert, etc.

Figure 4:
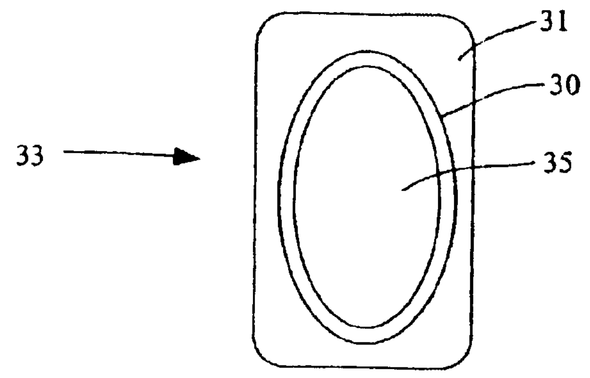
FIG. 4 shows an exemplary embodiment of a subject MALDI sample holder having a single fluid retaining structure.

FIG. 4 shows an exemplary embodiment of the subject invention. As shown, a subject MALDI sample holder 33 includes fluid retaining structure 30 which is disposed around and marks the perimeter of an interior area 35 on a substrate 31. The interior area and the fluid retaining structure thus define a well that is adapted for retaining a fluid, where the well is defined by the walls of the fluid retaining structure and the substrate surface that is bounded or enclosed by the fluid retaining structure (i.e., the interior area). The shape of the interior area may be altered depending on the desired use, e.g., by altering the configuration of the fluid retaining structures and/or substrate surface, and the like.

Multiple, discrete fluid retaining structures may be defined on a single substrate (see for example FIGS. 5–8), allowing different samples to be applied to and analyzed on a single substrate, thus potentially reducing cost, increasing throughput, or increasing the number of different analytes which can be analyzed using a single substrate. It can be seen from the figures that the fluid retaining structures may be continuous, like that shown in FIGS. 8 and 9, or may be discontinuous structures, like those shown in FIGS. 5–7.

The shape of a fluid retaining structure will depend on a variety of factors such as the analyte of interest, the particular MALDI device employed, etc. For example, the shape is selected such that the fluid retaining structure is able to accommodate a laser beam directed into the interior thereof, i.e., directed at the sample retained by the fluid retaining structure. As such, the subject fluid retaining structures may assume a variety of different shapes such that the shapes of these structures range from simple to complex. In many embodiments, the fluid retaining structures will assume a square, rectangular, oblong, oval or circular shape, although other shapes are possible as well, such as other geometric shapes, as well as irregular or complex shapes. In certain embodiments described in greater detail below, the width or diameter of a fluid retaining structure may not be constant throughout the entire thickness or height of the structure, i.e., the width may vary. Accordingly, shapes such as cone-like, spiral, helical, pyramidal, parabolic or frustum shape are possible as well. Also contemplated by the subject invention are fluid retaining structures made up of a plurality of fluid retaining structures stacked one on top of the other, where some or all of the stacked fluid retaining structures have the same dimensions or some or all may differ in one or more dimensions, e.g., height, width, etc. As noted above, one or more fluid retaining structures may be in the form of one or more channels, e.g., to facilitate the direct deposit of a continuous stream of effluent from a liquid chromatography column or the like to the substrate surface.

Figure 5:
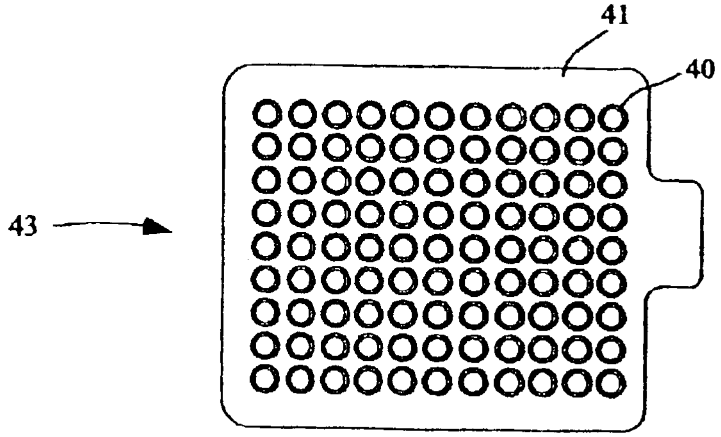
FIG. 5 shows an exemplary embodiment of a subject MALDI sample holder having a plurality of fluid retaining structures.
Figure 6:
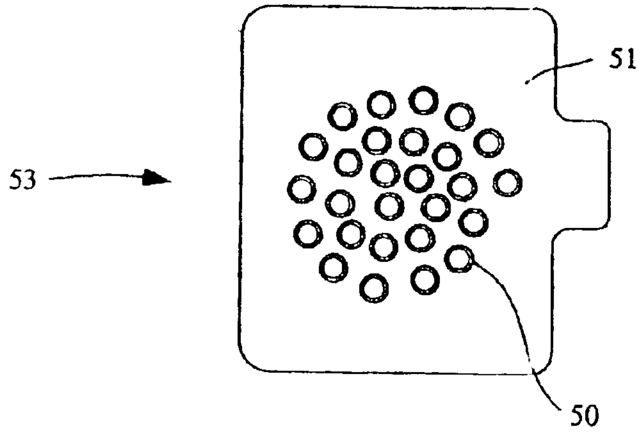
FIG. 6 shows an exemplary embodiment of a subject MALDI sample holder having a plurality of fluid retaining structures.
Figure 7:
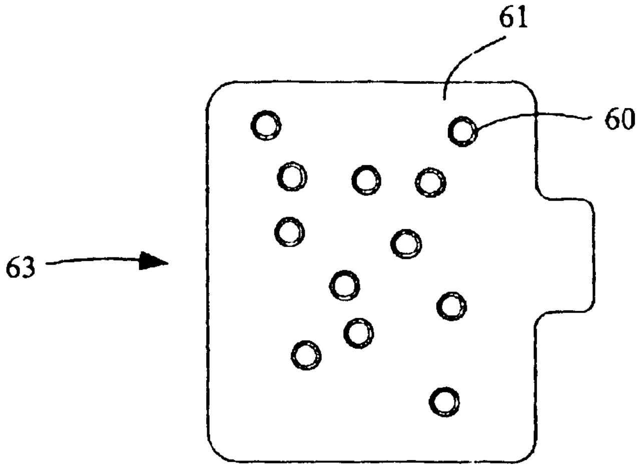
FIG. 7 shows an exemplary embodiment of a subject MALDI sample holder having a plurality of fluid retaining structures.

Typically, the number of fluid retaining structures present on a substrate ranges from about 1 to about 2000 or more, for example as many as about 2500, 3000, 3500, 4000, 4500, and 5000 or more fluid retaining structures may be present on a single substrate. As such, the configuration or pattern of fluid retaining structures may vary depending on a variety of factures such as the particular MALDI protocol being employed, the number of fluid retaining structures present, the size and shape of the fluid retaining structures present, etc. For example, the pattern of the fluid retaining structures may be in the form of a grid or other analogous geometric pattern or the like, e.g., similar to a conventional microtiter plate grid pattern. FIG. 5 shows an exemplary embodiment of the subject MALDI sample holder 43 having a plurality of fluid retaining structures 40 on substrate 41. In this particular embodiment, the plurality of fluid retaining structures is in the form of a 11×9 array or grid of well (99 wells). The multiple fluid retaining structures substrate may be fabricated in other configurations, for example, a 16×24 array or grid of wells (384 wells), an 8×12 array of wells (not shown), a 32×48 array of wells (not shown), etc. In certain other embodiments, the fluid retaining structures are not in the form of a grid. FIGS. 6 and 7 show exemplary embodiments wherein the fluid retaining structures are present in a non grid-like pattern. FIG. 6 shows an exemplary embodiment of a subject MALDI sample holder 53 having a plurality of fluid retaining structures 50 in a circular pattern on substrate 51. FIG. 7 shows an exemplary embodiment of a subject MALDI sample holder 63 having a plurality of fluid retaining structures 60 in a complex or non-linear pattern on substrate 61.

Figure 8:
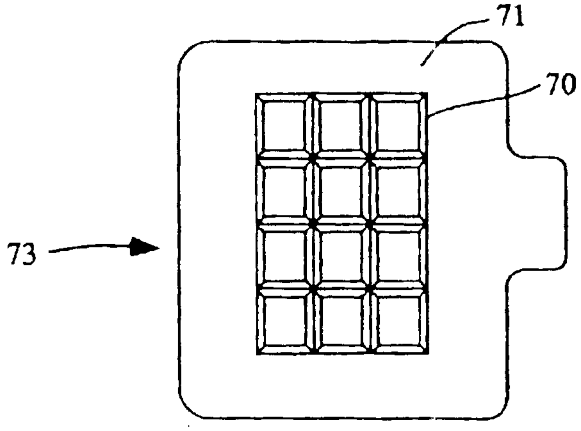
FIG. 8 shows an exemplary embodiment of a subject MALDI sample holder having a plurality of continuous fluid retaining structures.

As shown in FIGS. 5, 6 and 7, areas of a substrate having no fluid retaining structures may be present between the fluid retaining structures (i.e., inter-well areas) such that the wells are discontinuous, however these areas need not be present in certain embodiments, as shown for example in the MALDI sample holder 73 of FIG. 8 such that the fluid retaining wells 70 are continuous on substrate 71. It is to be understood that the number of fluid retaining structures, and patterns of such, represented in the exemplary embodiments described herein are representative only and are in no way intended to limit the scope of the present invention.

The physical dimensions of a fluid retaining structure may be characterized in terms of thickness, width, and length. Thickness or height is defined as the perpendicular distance from the substrate surface to most distal (i.e., top) surface of the fluid retaining structure. The width of a fluid retaining structure is defined as the distance from one side of the a fluid retaining structure through the fluid retaining structure to the opposing side of the fluid retaining structure, proceeding on a line parallel to the a fluid retaining structure surface but perpendicular to the fluid retaining structure's long axis at the particular point where the length is being measured. The length is defined as the long axis of the fluid retaining structure that is parallel to the plane of the substrate surface. In those embodiments having more than one fluid retaining structure, it is to be understood that the dimensions (and/or the shapes) of the fluid retaining structures may be the same or some or all of the fluid retaining structures may have different dimensions (and/or shapes).

In general, the dimensions of a fluid retaining structure are such that any fluid retaining structure is able to accommodate a volume of fluid sufficient to perform the MALDI protocol at hand. Typically, the fluid retaining structures have a volume ranging from about 0.1 microliter to about 10 microliters or more, in certain embodiments from about 0.1 microliters to about 5 microliters and in certain embodiments ranges from about 0.1 microliters to about 2 microliters.

The thickness of a fluid retaining structure is of a dimension that is suitable to allow a laser to impinge at an appropriate angle on the substrate retained by a fluid retaining structure without blocking or otherwise adversely limiting the area the laser can interrogate within the fluid retaining structure. Accordingly, the thickness of a fluid retaining structure is typically at least about 5 micrometers, e.g., at least about 10 micrometers, e.g., at least about 15 micrometers and in certain embodiments at least about 20 micrometers or more, where the thickness may be about 25 micrometers or more in some embodiments, and may be up to about 50 micrometers or more in other embodiments, and up to about 100 micrometers or more, or even about 250 micrometers or more in still other embodiments. In larger scale devices, the thickness may be up to about 250 micrometers or more in certain embodiments, up to about 500 micrometers or more in some embodiments, up to about 1000 micrometers.

The width or diameter of a fluid retaining structure is typically at least about 400 micrometers or more, e.g., about 500 micrometers or more, e.g., about 700 micrometers or more, e.g., about 1000 micrometers or more. In larger scale devices, the width may range from about 1.0 to about 1.5 millimeters or more, e.g., in certain embodiments the width may range from about 1.5 millimeters to about 3 millimeters or more.

In certain embodiments, the width or diameter of a fluid retaining structure may change or vary, e.g., may increase or decrease, from one side of a fluid retaining structure to the opposite side, e.g., the top surface or side may have a diameter or width that is greater relative to the diameter or width of the bottom or opposite side, i.e., the substrate contacting surface, or vice versa. Such increase or decrease may be gradual, stepped, etc. For example, a fluid retaining structure may have a cone-like, spiral, helical, pyramidal, parabolic or frustum shape. Such an increase or decrease in width may be accomplished in any convenient manner. In certain embodiments, one or more fluid retaining structures having different dimensions, e.g., different widths or diameters, may be stacked one top of the other, either before or after curing. The plurality of fluid retaining structures may be held together as a unit using any convenient technique, e.g., curing may adhere the fluid retaining structures together, an adhesive may be employed, etc. In other embodiments, the fluid retaining structure may be a unitary structure, i.e., formed of a single fluid retaining structure, e.g., a fluid retaining structure may be in the form of a spiral or the like, produced from a single or continuous piece of material.

The length of a fluid retaining structure is typically at least about 400 micrometers or more, e.g., about 500 micrometers or more, e.g., about 700 micrometers or more, e.g., about 1000 micrometers or more and in certain embodiments ranges from about 1000 micrometers to about 2000 micrometers or more, where in larger scale devices the length may range from about 1.5 millimeters to about 4.0 millimeters or more, e.g., may range from about 1.5 millimeters to about 3.5 millimeters.

The fluid retaining structure material(s) is selected to provide a fluid retaining structure having particular properties, e.g., suitable thickness, structure and fluid retaining properties, stability, inertness. The subject fluid retaining structures may be flexible or deformable upon application of a suitable force thereto or may be rigid, i.e., not easily deformable or not deformable at all upon application of a suitable force thereto.

A feature of the subject fluid retaining structures is that the fluid retaining structures include a material that changes from a first fluid state to a second solid state in response to a stimulus. In other words, the subject fluid retaining structures are formed by employing a suitable curing protocol and as such the material of the fluid retaining structures may correctly be characterized as a curable material. In other words, in accordance with the subject invention, the material of the fluid retaining structures are transformed or otherwise altered or changed from a fluid state to a solid state in response to a stimulus, where the transformation, alteration or change from the fluid state to the solid state is irreversible. The solid state or solid form of the fluid retaining structures is suitable for use in a MALDI protocol, e.g., the fluid retaining structures are insoluble to the fluid retained thereby, i.e., the solid fluid retaining structures are not soluble in or are not able to be solublized by the fluid retained in the fluid retaining structures. As will be described in greater detail below, the subject fluid retaining structures may be changed from a fluid state to a solid state prior to or after being positioned at an intended location on a substrate surface.

Any material having suitable characteristics may be used as a fluid retaining structure material. Suitable fluid retaining structure material may derive from naturally occurring materials, naturally occurring materials that have been synthetically modified, or synthetic materials. Fluid retaining structures materials are generally fluid materials that may be cured to provide a solid fluid retaining structure having suitable characteristics. Selection of a fluid retaining structure material is determined relative to the intended application. Suitable fluid retaining structure materials include, polymers, elastomers, silicone sealants, urethanes, and polysulfides, latex, acrylic, etc. Of interest are silicone sealant materials such as Loctite 5964 thermal cure silicone. In certain embodiments, the fluid retaining structure material is a fluoropolymer such as polytetrafluoroethylene, e.g., a Teflon® such as a liquid Teflon®, e.g., Teflon® AF which are a family of amorphous fluoropolymers provided by E. I. du Pont de Nemours and Company.

In many embodiments, a low durometer material is used. Silicone sealant materials are available in many formulations that are suitable for use in the process of making fluid retaining structures according to the subject invention. For very thin fluid retaining structures, for example having dimensions that range from about 20 to about 100 micrometers thick, a self-leveling, low viscosity, fluid material may be employed. Thicker fluid retaining structures may employ a wider range of materials including higher viscosity materials to non-slumping or paste materials.

Also of interest are "self-leveling" materials such as self-leveling silicone materials. These self-leveling materials aid in the manufacture of the fluid retaining structure. By using a low viscosity (about 15,000 to about 50,000 cps, or centipoises) silicone that is "self leveling", a very small bead of silicone can be used to form a fluid retaining structure, e.g., applied to a substrate surface. Because it is self-leveling, the small bead of silicone will spread out to a thin profile, or cross section. In some embodiments, the silicone will have a viscosity that ranges from about 20,000 to about 40,000 cps, or even ranges from about 25,000 to about 35,000 cps. In other embodiments, the viscosity may range from about 50,000 to about 80,000 cps.

In certain embodiments, at least a portion of a subject fluid retaining structure is hydrophobic, where the material of the subject fluid retaining structure may be inherently hydrophobic or be made hydrophobic, e.g., by a hydrophobic agent, chemical manipulation, etc. By "hydrophobic" it is meant that at least a portion of a surface of a subject fluid retaining structure is substantially if not completely unwettable and substantially if not completely liquid repellant for the sample retained therein, even if the sample is not an aqueous solution. For example, in the case of an oily-based sample, it should therefore correspondingly be a lipophobic surface. In certain embodiments, at least a portion of a subject fluid retaining structure is hydrophilic, where the material of the subject fluid retaining structure may be inherently hydrophilic or be made hydrophilic, e.g., by a hydrophilic agent, chemical manipulation, etc. By "hydrophilic" it is meant that at least a portion of a surface of a subject fluid retaining structure is easily wettable for the type of sample retained therein, even if the sample is not an aqueous solution. In certain embodiments, a fluid retaining structure may have one or more areas that are hydrophobic and one or more areas that are hydrophilic.

As mentioned above, a fluid retaining structure may be formed directly on a MALDI substrate surface or may be formed elsewhere (i.e., on a non MALDI substrate) and then transferred to a MALDI substrate surface. That is, in certain embodiments, the fluid retaining structure material is deposited as a fluid onto an intended MALDI substrate and then changed into a solid utilizing a suitable stimulus such that the fluid retaining structure is formed in the place it is to be positioned on the MALDI substrate. In certain other embodiments, the fluid retaining structure is formed at a location apart from the MALDI substrate upon which it is to be finally positioned such that it is formed on a non-MALDI substrate. In this case, once the material is changed into a solid utilizing a suitable stimulus, it is transferred to a position on a MALDI substrate, where it may be maintained in a fixed position on the MALDI substrate by inherent bonding or adhesive properties or by one or more ancillary bonding agents such as adhesives or the like to maintain a position on a substrate.

In those embodiments where the fluid retaining structure is formed directly onto a MALDI substrate surface, the fluid retaining structure material may be applied to the MALDI substrate surface by any suitable method, e.g., silk screen, brush, spray, or transfer process. Accordingly, in this instance forming the fluid retaining structure having a desired configuration is accomplished by depositing a suitable fluid retaining structure material in a predetermined configuration onto the MALDI substrate surface and then curing the fluid retaining structure material to provide the finished fluid retaining structure having the desired configuration. In certain embodiments, the method of applying the fluid retaining structure material to the MALDI substrate surface employs a dispensing system analogous to those designed for adhesive sealants, e.g., an automated dispensing system. Such a dispensing system has an x-y-z positioning system and is programmable to allow the application of a thin bead of material, e.g., a thin bead of silicone or Teflon, onto the MALDI substrate surface in the desired configuration. A suitable system is the Automove 403 and is available from Asymtek (Carlsbad, Calif.). Other protocols for directly forming a fluid retaining structure on a substrate surface are known to those of skill in the art and are contemplated by the subject invention.

As described above, in certain embodiments an indirect protocol is employed such that the fluid retaining structure having a desired configuration is accomplished by depositing a suitable fluid retaining structure material in fluid form in a predetermined configuration onto a first location, that is different from the location on the MALDI substrate surface to which it will be finally positioned (i.e., the second location), and then curing the fluid retaining structure material to provide the finished solid, fluid retaining structure having the desired configuration. Following this, the formed fluid retaining structure may then be transferred to its final, intended position on the MALDI substrate surface. In certain indirect embodiments, a pad transfer process may be used. Accordingly, to apply a pattern of the fluid retaining structure material using a pad transfer process, a negative relief of the pattern is generated so that the desired thickness of the adhesive is the depth of the relief in the mold. The mold is then covered with the fluid retaining structure material and pressed into the mold, and the excess is scraped off. A flexible pad is then pressed onto the relief area and the fluid retaining structure material is transferred from the mold to the surface of the pad. The pad is then moved into the desired position for the fluid retaining structure. As the pad contacts the substrate surface, again the fluid retaining structure material is transferred from the pad onto the substrate surface. A company that manufactures and distributes pad printing technologies is Printex, A Division Of Pemco Industries, Inc. (Poway, Calif.). This pad transfer method is exemplary only and is in no way intended to limit the scope of the invention as other protocols for forming a fluid retaining structure at a site remote or different from a substrate surface location that is the intended final position of the fluid retaining structure and then transferring the formed fluid retaining structure to the substrate surface will be apparent to those of skill in the art and are contemplated by the subject invention. For example, protocols analogous to any of the above-described protocols that may be employed to form a fluid retaining structure directly on a substrate surface may also be employed for forming a fluid retaining structure at a first non-substrate location and then transferring the formed fluid retaining structure to the appropriate final substrate location may be employed.

After the fluid retaining structure material is deposited in a fluid form in the predetermined configuration either at the desired site on a MALDI substrate surface or at another location (e.g., a non-MALDI substrate), the fluid retaining structure material is changed or transformed or rather is cured to form a fluid retaining structure that is solid by the application of a suitable stimulus thereto. Any suitable stimulus may be employed, where various stimuli are known in the art for changing a fluid material to a solid material. Accordingly, various methods of curing are available and may be utilized with the subject invention, the choice of which depends on a variety of factors such as the particular fluid retaining structure material(s) used, i.e., the particular properties of the material(s), the amount of time available for curing, etc.

For example, in certain embodiments, the fluid retaining structure material may be exposed to moisture to cause or to speed up the curing process. In such embodiments, moisture in the air reacts with the material to cure it. For example, moisture cure RTV silicone may be employed. Typical cure times for these RTV silicones range from about 1 day to about several days. In certain embodiments, the fluid retaining structure material may be exposed to heat to cause or to speed up the curing process. Heat cure fluid retaining structure material, such as heat cure silicone, are cured by a process of heating the material well above room temperature for a sufficient period of time, typically from about 10 minutes to about 2 hours. In certain embodiments, the fluid retaining structure material may be exposed to UV or visible light to cause or to speed up the curing process. Curing by UV cure is usually relatively fast, e.g., curing times from as little as about a few seconds, for example ranging from as little as 1 second to about 30 seconds or so. In certain embodiments, curing agents may be employed that cause or facilitate the curing process. These curing agents are typically catalysts to the curing process and may be used with one or more polymers, e.g., a polymer/catalyst combination may be employed. In certain embodiments, two or more curing protocols are employed.

Systems

Also provided are systems that include a MALDI device and at least one subject MALDI sample holders. By "MALDI device" it is meant any apparatus capable of performing some or all steps of a MALDI protocol. Such MALDI devices thus include, but are not limited to, automated MALDI sample preparation devices, automated sample dispensing devices, mass spectrometers, etc., as well as partially and fully integrated or interfaced devices that perform a plurality of operations associated with a MALDI protocol such as sample preparation functions and/or sample dispensing functions and/or mass spectrometer functions, and the like.

Examples of MALDI devices suitable for use with the subject invention include, but are not limited to, those described elsewhere herein, as well as those described in U.S. Pat. Nos. 6,111,251; 6,287,872; 6,414,306; 6,423,966, the disclosures of which are herein incorporated by reference.

Methods of Performing a MALDI Protocol

Also provided by the subject invention are methods of performing a MALDI protocol. MALDI protocols are employed in a variety of fields such as proteomics, genomics, and the like. In general, the subject methods include providing a subject MALDI sample holder as described above. An analyte of interest is then deposited into at least one fluid retaining structure of the MALDI sample holder, where in certain embodiments a plurality of analytes may be deposited in a plurality of different fluid retaining structures, where one or more analytes may be same or may be different. The MALDI sample holder is then operatively coupled to, e.g., inserted into or otherwise associated with, a MALDI device, and MALDI is performed on the analyte(s) retained in the one or more fluid retaining structures so that the analyte(s) may be characterized.

Accordingly, once a subject MALDI sample holder is provided, one or more analytes are selected for use in the MALDI protocol. A wide variety of analytes may be employed and include naturally occurring and synthetic analytes such as any naturally occurring or synthetic polymeric molecule. Analytes employed may range in size from about 500 Da or more, to about 50,000 Da or more, to about 1 million Da or more. Analytes that may be employed in the subject invention include, but are not limited to, proteins, peptides, glycoproteins, oligonucleotides, polysaccharides, nucleic acids, lipids, fullerene compounds, glycolipids, organic compounds, microorganisms such as bacteria and the like, etc. Typically, the analyte is dissolved in a suitable solvent. For example, in the analysis of peptides/proteins, 0.1 %TFA may be employed as the solvent and in the analysis of oligonucleotidcs, pure 18 Megohms water may be employed.

MALDI protocols employed with the subject methods may vary in detail depending on the analyte to be analyzed, the particular MALDI protocol employed, etc., where MALDI protocols include, but are not limited to, AP-MALDI and vacuum MALDI protocols. However, common to all MALDI protocols is the preparation of a sample that includes the analyte of interest and a matrix. In other words, once an analyte of interest is selected, it is mixed with a matrix. In certain embodiments, prior to mixing the analyte with the sample, the analyte may be processed, e.g., enzymatically digested, desalted, etc.

A matrix is typically a small organic, volatile compound with certain properties that facilitate the performance of MALDI, e.g., the light absorption spectrum of the matrix crystals must overlap the frequency of the laser pulse being used, the intrinsic reactivity of the matrix material with the analyte must be suitable, the matrix material must demonstrate adequate photostability in the presence of the laser pulse, the volatility and affinity for the analyte must be suitable, etc. Accordingly, a matrix is selected based on a variety of factors such as the analyte of interest (type, size, etc.), etc. Examples of matrices include, but are not limited to; sinapinic acid (SA); alpha-cyano-4-hydroxycinnamic acid (HCCA); 2,5-dihydroxybenzoic acid (DHB); 3-hydroxypicolinic acid (HPA); 2',4',6'-trihydroxyacetophenone; and dithranol. The matrix is typically dissolved in a suitable solvent that is selected at least in part so that it is miscible with the analyte solvent. For example, in the analysis of peptides/proteins HCCA and SA work best with ACN/0.1%TFA as solvent and in the analysis of oligonucleotides HPA and ACN/$H_2O$ may be employed.

Accordingly, after the appropriate matrix is selected, the analyte is thoroughly mixed or suspended in the matrix at a suitable ratio to provide a sample that includes the analyte/matrix mixture. In many embodiments, saturated solutions of the matrix are thoroughly mixed with very dilute solutions (e.g., nmole/μl to fmole/μl) of the analyte in a suitable ratio. In certain embodiments, for example when the analyte is a protein, higher concentrations may be required (e.g., 0.1 mmole to about 1 mmol). The exact ratio of the matrix to sample will vary, but typically ranges from about 1:1 to about 20:1 or more, where in many embodiments ranges from about 1:1 to about 10:1. In certain embodiments, co-matrices or matrix additives may be added to the sample mixture to enhance the quality of the MALDI procedure, e.g., by increasing ion yields; decreasing and/or increasing fragmentation; increasing the homogeneity of the matrix/analyte; decreasing cationization; increasing sample-to-sample reproducibility; etc. The sample may be processed before a co-matrix is added, e.g., any involatile compounds may be depleted or removed, etc.

After a suitable sample of a matrix/analyte is prepared, a suitable amount of the sample is deposited into a fluid retaining structure of the MALDI sample holder, where the sample is retained due to the configuration of the fluid retaining structure. Typically, a plurality of samples are deposited into respective fluid retaining structures, where some or all of the samples employed may be the same or some or all of the samples may be different. The sample(s) may be introduced into a fluid retaining structure using any convenient protocol, e.g., using a pipette, syringe, etc. In certain embodiments an automated or robotic dispensing apparatus is employed. Once introduced into a fluid retaining structure, a sample is substantially confined to the fluid retaining structure. In this regard, multiple samples may be tested without cross-contamination, i.e., multiple samples may be introduced into different fluid retaining structures, where some or all of the samples employed may be the same or some or all of the samples may be different. The amount of sample that is deposited into each fluid retaining structure may vary depending on the type of sample, the particular MALDI protocol employed, etc. Typically a volume ranging from about 0.1 microliters to about 10 microliters or more is deposited in a fluid retaining structure, in certain embodiments from about 0.1 microliters to about 5 microliters and in certain embodiments from about 0.1 microliters to about 2 microliters is deposited. In certain embodiments, proteins and peptides from electrophoresis gels may be directly deposited in a fluid retaining structure. Calibration standards may be deposited in one or more fluid retaining structures, e.g., to dynamically calibrate a MALDI device such as a mass spectrometer, and/or controls such as positive and/or negative controls may also be employed.

A feature of the subject invention is that the configuration (e.g., size, shape, color, etc.) of the fluid retaining structure provides a distinguishable reference point or guide for a particular location on the substrate surface. That is, the fluid retaining structure may be used to accurately guide a sample deposition device such as a pipette tip, syringe, or the like, whether automated or not, to a specific location on the substrate surface, e.g., to a specific fluid retaining structure.

Once one or more samples are deposited in fluid retaining structures, the sample is typically dried resulting in a solid deposit of analyte-doped matrix crystals or the sample may be maintained in fluid form, however desorption from aqueous solutions has been employed as well (see for example Laiko et al. describing such using an IR laser in J. of the American Society for Mass Spectrometry, published online Feb. 14, 2002). In a drying protocol, the matrix molecules dry out of solution with analyte molecules in the resulting matrix crystals. Drying may be accomplished using any convenient method such as air drying (i.e., room temperature drying), vacuum drying, etc.

Regardless of whether the sample is dried or not, once deposited in a fluid retaining structure, MALDI may then be performed on the one or more samples. Accordingly, the MALDI sample holder having one or more samples retained in one or more fluid retaining structures is inserted into or otherwise coupled to a MALDI device so that MALDI may be performed on the one or more samples. In general, in the performance of MALDI, laser energy is directed to a sample retained in a fluid retaining structure. Nitrogen lasers operating at 337 nm are the most common illumination sources, as such lasers are usually well absorbed by many matrices. However, other lasers may also be employed, e.g., other UV and IR lasers. Upon laser irradiation, the matrix and analyte molecules are desorbed and ionized. Transmission and reflection geometry may be employed. In reflection geometry, typically a laser illuminates the sample or analyte on the front side of the substrate such that laser illumination takes place on the same side of the substrate as ion extraction, e.g., the front of an opaque substrate surface. In transmission geometry, laser illumination is accomplished through the back side of the substrate, i.e., illuminates a sample from behind (see for example Galicia et al., Analytical Chemistry, vol. 74, 1891–1895 (2002)). The use of transmission geometry enables the use of samples such as tissues and cells which cannot be used with reflection geometry.

Once desorbed and ionized, the ions may be analyzed. As described above, a variety of analysis devices and methods for analyzing MALDI provided ions are known in the art and may be employed in accordance with the subject invention. In certain embodiments, the subject methods include analyzing the ions provided by the above-described MALDI protocol using a mass spectrometer. In further describing the subject invention, a time-of-flight mass spectrometer ("TOF-MS") or an ion trap mass spectrometer is used for exemplary purposes only and is in no way intended to limit the scope of the subject invention.

Accordingly, in certain embodiments, a TOF-MS (or an ion trap mass spectrometer or the like) is operatively coupled to the MALDI apparatus used to ionize the analyte. Once ionized, the ions are electrostatically accelerated and transferred to a flight-tube that is free of electrostatic fields. It is in the flight tube where the ions are separated from each other based on their mass-to-charge (m/z) ratios. A detector detects and records the time it takes for each ion to arrive at the detector (at the end of the flight tube) as well as the signal intensity of each ion, such that lighter ions exit the flight tube first, followed by the heavier ions in increasing order of mass-to-charge ratio (i.e., ions with a larger mass travel at a slower velocity and therefore arrive at the detector after smaller mass ions). In this manner, a mass spectrum may be provided that provides information about the ions such as concentration and structural information.

Any convenient MALDI protocol may be adapted and employed with the subject invention. Representative MALDI protocols, as well as apparatuses for use in performing MALDI protocols, that may be adapted for use with the subject invention include, but arc not limited to, those described in International Publication Nos.: GB 2,312782 A; GB 2,332,273 A; GB 2,370114A; and EP 0964427 A2, as well as in U.S. Patent Publication No. 2002031773; and U.S. Pat. Nos.: 5,498,545; 5,643,800; 5,777,324; 5,777,860; 5,828,063; 5,841,136; 6,111,251; 6,287,872; 6,414,306; and 6,423,966; previously incorporated herein by reference.

In certain embodiments, the subject methods include a step of transmitting data, e.g. mass spectrum data, from the above-described methods to a remote location. By "remote location" it is meant a location other than the location at which the subject MALDI sample holder is present and the MALDI occurs. For example, a remote location could be another location (e.g. office, lab, etc.) in the same city, another location in a different city, another location in a different state, another location in a different country, etc. As such, when one item is indicated as being "remote" from another, what is meant is that the two items are at least in different buildings, and may be at least one mile, ten miles, or at least one hundred miles apart. "Communicating" information means transmitting the data representing that information as electrical signals over a suitable communication channel (for example, a private or public network). "Forwarding" an item refers to any means of getting that item from one location to the next, whether by physically transporting that item or otherwise (where that is possible) and includes, at least in the case of data, physically transporting a medium carrying the data or communicating the data. The data may be transmitted to the remote location for further evaluation and/or use. Any convenient telecommunications means may be employed for transmitting the data, e.g., facsimile, modem, Internet, etc.

Kits

Also provided are kits, where the subject kits at least include one or more MALDI sample holders and reagents for preparing a sample for MALDI, as described above. The one or more MALDI sample holders may include one or a plurality of fluid retaining structures thereon. In certain embodiments, a plurality of MALDI sample holders may be provided, where some or all may be the same or some or all may be different in one or more respects, e.g., differ in the number, pattern, size, shape, material, volume, etc., of the fluid retaining structure(s) present, differ in the size, shape, material, etc., of the substrate, etc., such that a variety of different MALDI sample holders may be available in a kit for a variety of different applications.

Also included in the subject kits are one or more reagents for preparing a sample for MALDI. As such, the reagents may include one or more matrices, solvents, desalting agents, enzymatic agents, denaturing agents, positive and negative controls, calibration standards, etc., as described above. As such, the kits may include one or more containers such as vials or bottles, with each container containing a separate component for carrying out a MALDI protocol.

In many embodiments of the subject kits, the MALDI sample holder(s) and reagents for preparing a sample for MALDI are packaged in a kit containment element to make a single, easily handled unit, where the kit containment element, e.g., box or analogous structure, may or may not be an airtight container, e.g., to further preserve the MALDI sample holder(s) and reagents until use.

The subject kits also generally include instructions for how to prepare a sample for MALDI and/or how to use the MALDI sample holder with a MALDI protocol. The instructions are generally recorded on a suitable recording medium or substrate. For example, the instructions may be printed on a substrate, such as paper or plastic, etc. As such, the instructions may be present in the kits as a package insert, in the labeling of the container of the kit or components thereof (i.e., associated with the packaging or sub-packaging) etc. In other embodiments, the instructions are present as an electronic storage data file present on a suitable computer readable storage medium, e.g. CD-ROM, diskette, etc. In yet other embodiments, the actual instructions are not present in the kit, but means for obtaining the instructions from a remote source, e.g. via the internet, are provided. An example of this embodiment is a kit that includes a web address where the instructions can be viewed and/or from which the instructions can be downloaded. As with the instructions, this means for obtaining the instructions is recorded on a suitable substrate.

EXPERIMENTAL

The following examples are put forth so as to provide those of ordinary skill in the art with a complete disclosure and description of how to make and use the present invention, and are not intended to limit the scope of what the inventors regard as their invention. Efforts have been made to ensure accuracy with respect to numbers used (e.g. amounts, temperature, etc.) but some experimental errors and deviations should be accounted for. Unless indicated otherwise, parts are parts by weight, molecular weight is weight average molecular weight, temperature is in degrees Centigrade, and pressure is at or near atmospheric.

An AP-MALDI substrate was prepared such that a portion of its total area (slight more than half) included fluid retaining structures according to the subject invention and the other portion did not include any fluid retaining structures. The substrate was gold plated stainless steel. Accordingly, a total of 60 fluid retaining structures were prepared on the substrate surface by depositing and curing Loctite 5964 thermal cure silicone onto a surface of the substrate. These fluid retaining structures were placed in rows a-e (each row had 12 fluid retaining structures matching positions 1–12) on the substrate surface. Each fluid retaining structure had a diameter of about 3 mm, a width of about 1 mm and a height of about 0.5 mm. Rows f-h did not include any fluid retaining structures.

Two composite peptide solutions at 10 fmol/uL and 4 fmol/uL were employed (see below) and 0.5 uL of either of the two solutions or 0.5 uL of the HCCA matrix solution alone was pipetted or "spotted" either onto the non fluid retaining structure area of the substrate or into a fluid retaining structure. To prepare the solution at 10 fmol/uL, a composite stock solution of the 8 peptides (see peptide solution description below) at 20 fmol/uL was mixed with an equal volume of the HCCA matrix solution. To prepare the solution at 4 fmol/uL, one volume of the 20 fmol/uL solution was mixed with 4 volumes of the HCCA matrix solution. The HCCA solution contained HCCA at 1.25 mg/mL in 20% methanol, 22% isopropyl alcohol, and 1% acetic acid in water.

The AP-MALDI Ion Trap Operating Conditions are as follows:

Parameter: Setting

Instrument: Agilent Technologies 1100 Series LC/MSD Trap SL

Polarity: Positive

Dry gas flow rate: 5 L/min

Dry gas temperature: 325° C.

Mass range mode: Standard, 50–2200 m/z

Scan resolution: Peak width 0.5–0.65 amu, at a scan speed of 13,000 amu/sec

Scan range: 400–2200 amu

Number of MS scans for averaging: 10

The peptide solution includes the following peptides:

Neurotensin Fragment 1–8 @1030 m/z

Angiotensin II @1047.2 m/z

Bradykinin @1060.7 m/z

Synthetic peptide @1271 m/z

Angiotensin I @1296.8 m/z

Synthide @1509 m/z

Fibrinopeptide @1536.8 m/z

Ncurotensin @1673.1 m/z

Figure 10:
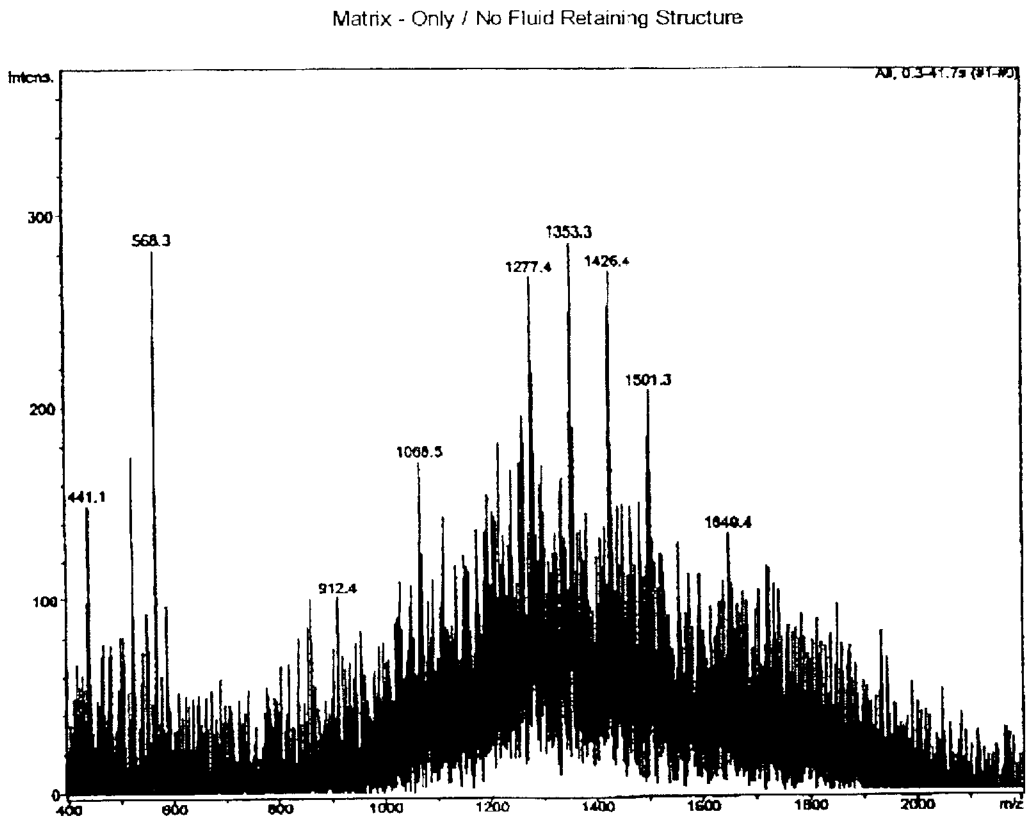
FIG. 10 shows a mass spectra of a matrix-only sample that was not retained by a subject fluid retaining structure.

The results are summarized below. Mass spectra obtained according to these experiments are provided in FIGS. 10, 11 and 12 (mass spectra of solution spotted onto area of substrate without fluid retaining structures) and FIGS. 13, 14 and 15 (mass spectra of solution spotted into fluid retaining structures). The respective solutions deposited and the correspondence to the mass spectra figures are as follows:

FIG. 10: matrix only (HCCA)—no fluid retaining structure

Figure 11:
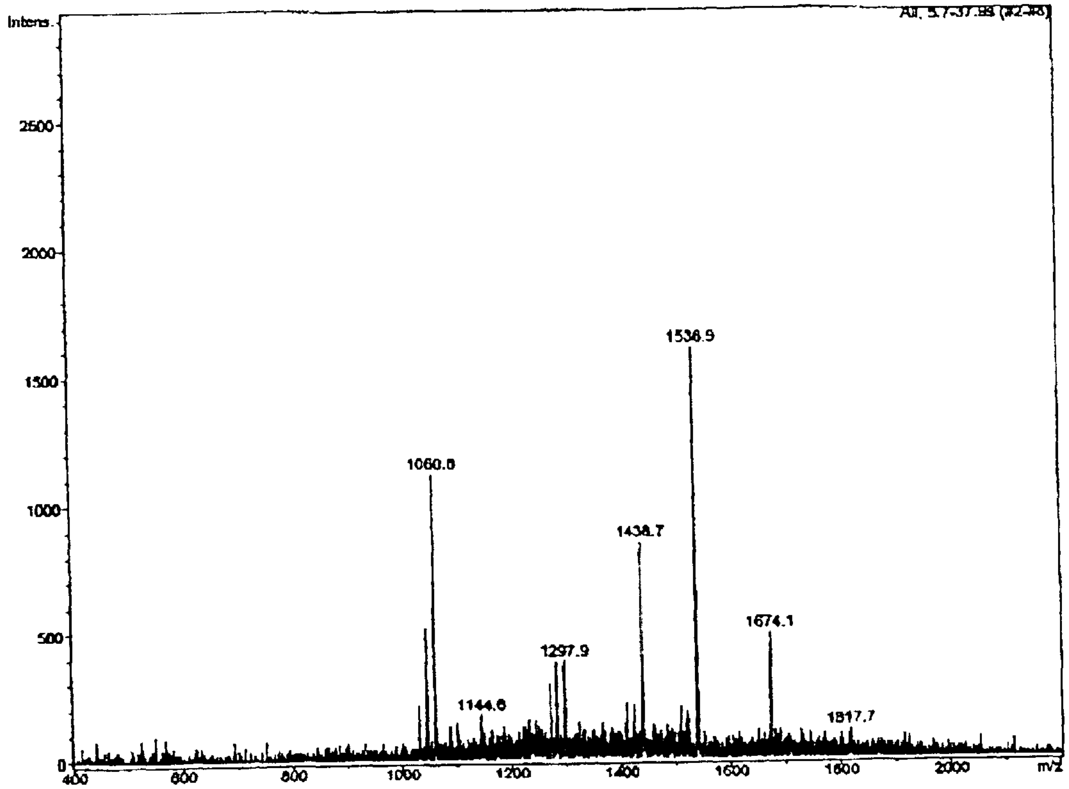
FIG. 11 shows a mass spectra of a composite peptide solution that was not retained by a subject fluid retaining structure.

FIG. 11: 2 fmol of 8 peptide solution—no fluid retaining structure

Figure 12:
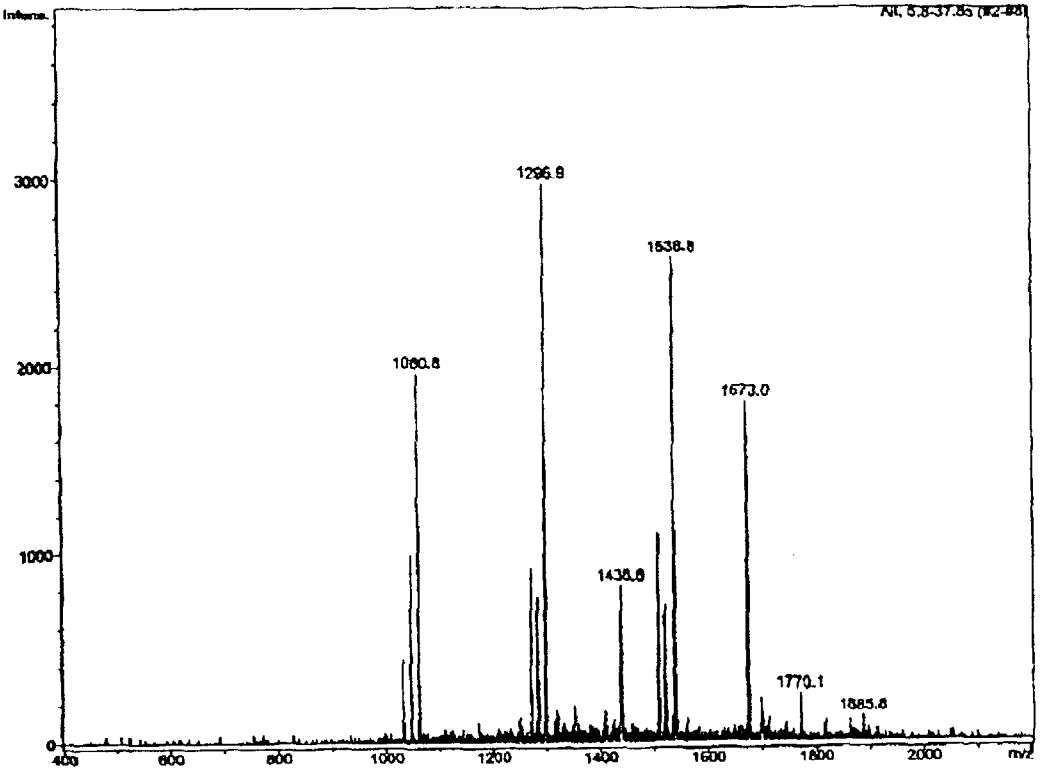
FIG. 12 shows a mass spectra of a composite peptide solution that was not retained by a subject fluid retaining structure.

FIG. 12: 5 fmol of 8 peptide solution—no fluid retaining structure

Figure 13:
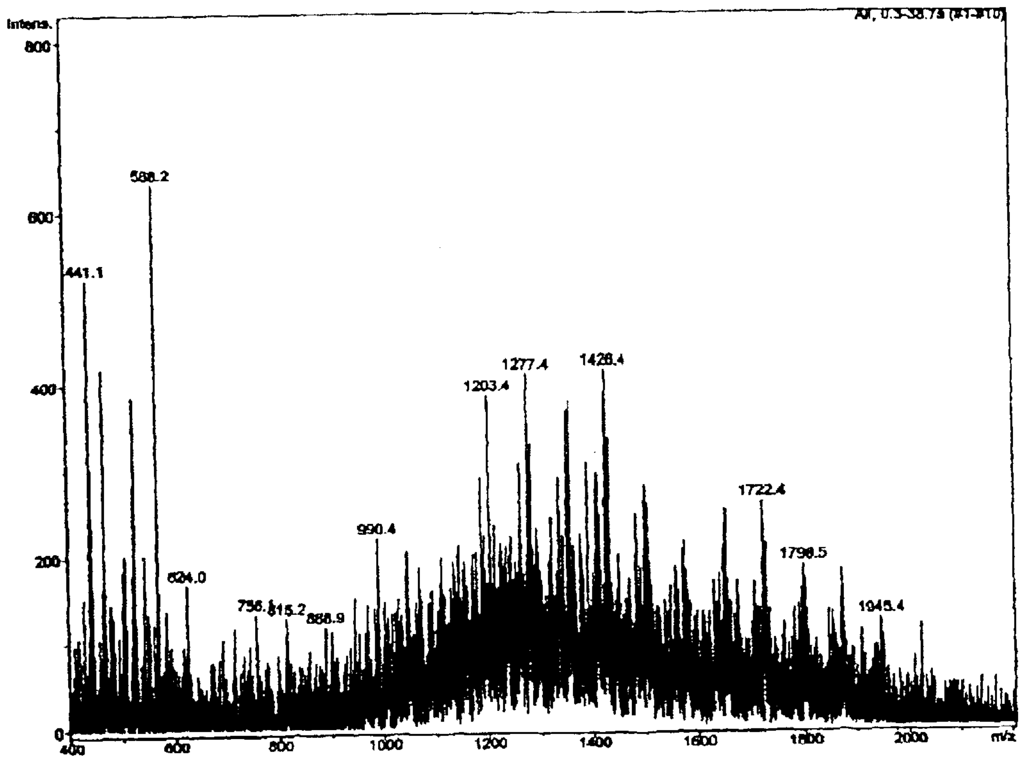
FIG. 13 shows a mass spectra of a matrix-only sample that was retained by a subject fluid retaining structure.

FIG. 13: matrix only (HCCA)—pipetted into a fluid retaining structure

Figure 14:
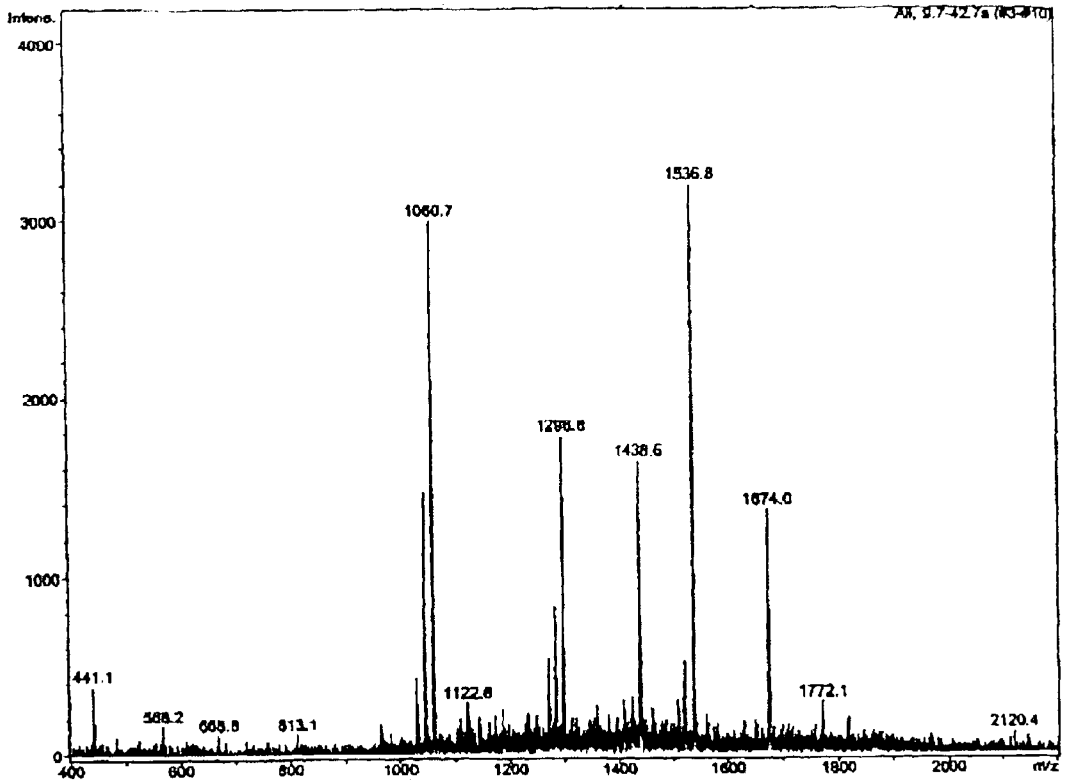
FIG. 14 shows a mass spectra of a composite peptide solution that was retained by a subject fluid retaining structure.
Figure 15:
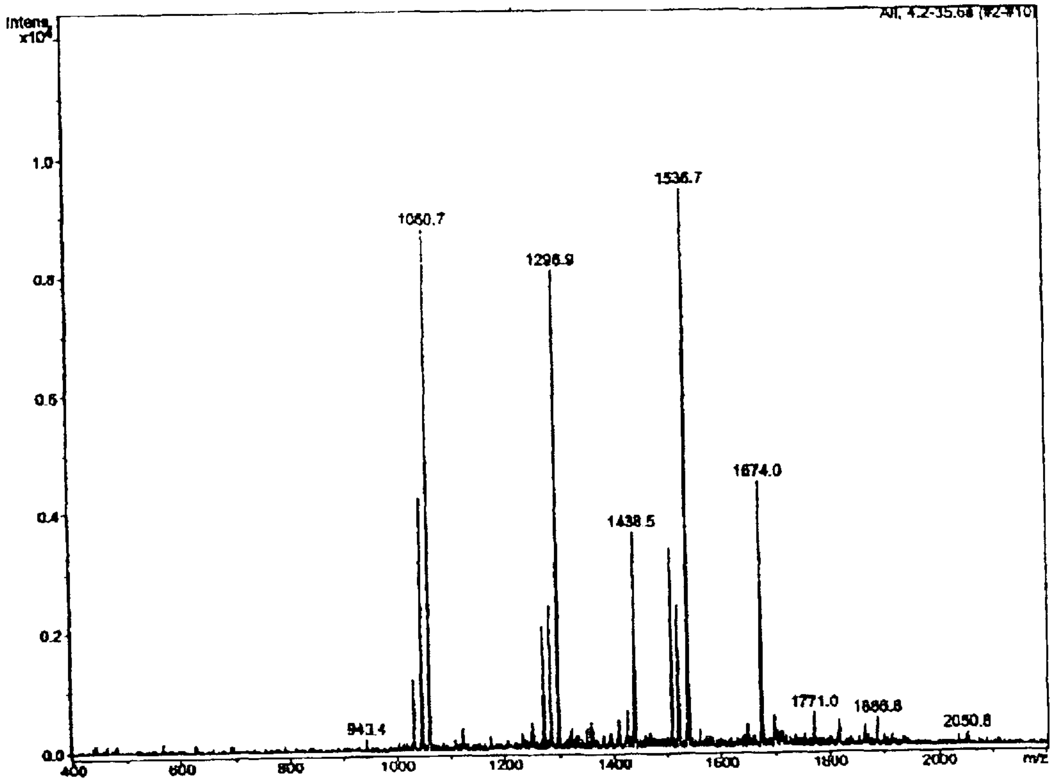
FIG. 15 shows a mass spectra of a composite peptide solution that was retained by a subject fluid retaining structure.

FIG. 14: 2 fmol of 8 peptide solution—pipetted into a fluid retaining structure FIG. 15: 5 fmol of 8 peptide solution—pipetted into a fluid retaining structure

Summary of Results

1. The background from the fluid retaining structures is minimal. Specifically, peaks at 1277.4, 1353.3, 1426.4 are at about 300 for matrix only/no fluid retaining structure and about 400 for matrix only/with fluid retaining structure, as shown in a comparison of FIGS. 10 and 13.

2. 2 fmol of the peptide solution deposited into the fluid retaining structures was easily detected. About a 2–3 fold increase in signal at 2 fmol/plate is achieved when using the fluid retaining structures, as shown in a comparison of FIGS. 11 and 14, and about a 3–5 fold increase at 5 fmol/plate is achieved, as shown in a comparison of FIGS. 12 and 15.

3. Using the fluid retaining structures also advantageously enables the elimination of a hydrophobic surface in order to get spots of the order of 200–300 um (with more hydrophilic surfaces, the spots are relatively larger in diameter than spots obtained according to the subject invention and the crystals from the solution tend to form on the edges of the spots deposited on these hydrophilic surfaces).

4. The samples deposited into the wells were effectively retained therein, while the samples not retained by the wells spread about the surface of the substrate.

It is evident from the above results and discussion that the above-described invention provides a useful MALDI sample holder for use in MALDI protocols. Specifically, the subject invention provides visual references or guides to designated areas on the substrate, effectively contains a sample in a designated area, is cost effective and easy to manufacture, is able to accommodate a wide range of sample volumes, does not adversely affect the desorption/ionization of a sample, and which may be provided in a wide variety of configurations including single sample configurations, as well as multiple sample configurations that are able to accommodate a plurality of sample without cross-contamination. As such, the subject invention represents a significant contribution to the art.

All publications and patents cited in this specification are herein incorporated by reference as if each individual publication or patent were specifically and individually indicated to be incorporated by reference. The citation of any publication its disclosure prior to the filing date and should not be construed as an admission that the present invention is not entitled to antedate such publication by virtue of prior invention.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, objective, spirit and scope of the present invention. All such modifications are intended to be within the scope of the claims appended hereto.

What is claimed is:

1. A MALDI sample holder comprising:

a substrate having at least one surface; and at least one fluid retaining structure present on said at least one surface which comprises a material that changes from a first fluid state to a second solid state in response to an applied stimulus;

wherein said MALDI sample holder is configured for use in a matrix assisted laser desorption/ionization protocol.

2. The MALDI sample holder according to claim 1, wherein said at least one fluid retaining structure is a well.

3. The MALDI sample holder according to claim 2, wherein said well has a volume that ranges from about 0.1 microliter to about 10 microliters.

4. The MALDI sample holder according to claim 2, wherein said at least one surface comprises a plurality of wells.

5. The MALDI sample holder according to claim 1, wherein said at least one fluid retaining structure is a channel.

6. The MALDI sample holder according to claim 1, wherein said material is hydrophobic.

7. The MALDI sample holder according to claim 1, wherein said material is a polymer.

8. The MALDI sample holder according to claim 7, wherein said polymer is an elastomer.

9. The MALDI sample holder according to claim 7, wherein said material is a fluoropolymer.

10. The MALDI sample holder according to claim 1, wherein said stimulus comprises at least one of moisture, heat, light, and catalyst.

11. A system comprising:

a matrix assisted laser desorption/ionization device; and a MALDI sample holder according to claim 1 capable of being used with said matrix assisted laser desorption/ionization device.

12. The system according to claim 11, wherein said at least one fluid retaining structure is a well.

13. The system according to claim 12, wherein said well has a volume that ranges from about 0.1 microliter to about 10 microliters.

14. The system according to claim 12, wherein said at least one surface comprises a plurality of wells.

15. The MALDI sample holder according to claim 11, wherein said at least one fluid retaining structure is a channel.

16. The system according to claim 11, wherein said material is hydrophobic.

17. The system according to claim 11, wherein said material is a polymer.

18. The system according to claim 17, wherein said polymer is an elastomer.

19. The system according to claim 17, wherein said material is a fluoropolymer.

20. The system according to claim 11, wherein said stimulus comprises least one of moisture, heat, light, and catalyst.

21. The system according to claim 11, wherein said system includes a mass spectrometer.

22. A method of ionizing components of a sample, said method comprising:

providing a MALDI sample holder according to claim 1;

depositing a sample into said at least one fluid retaining structure of said MALDI sample holder;

operatively associating said MALDI sample holder with a matrix-assisted laser desorption/ionization device; and ionizing components of said sample with said device.

23. The method according to claim 22, wherein said depositing comprises depositing about 0.1 microliter to about 10 microliters of a sample into a fluid retaining structure of said MALDI sample holder.

24. The method according to claim 22, wherein said MALDI sample holder comprises more than one fluid retaining structure and said depositing comprises depositing a sample into more than one fluid retaining structure.

25. The method according to claim 24, wherein at least two of said samples are different.

26. A kit for matrix-assisted laser desorption/ionization, said kit comprising:

a MALDI sample holder according to claim 1; and reagents for preparing a sample for matrix-assisted laser desorption/ionization.

27. The kit according to claim 26, wherein said reagents comprise one or more matrices.

28. The kit according to claim 27, wherein said one or more matrices comprises one or more of sinapinic acid; alpha-cyano-4-hydroxycinnamic acid; 2,5-dihydroxybenzoic acid; 3-hydroxypicolinic acid; 2',4',6'-trihydroxyacetophenone; and dithranol.

29. The kit according to claim 26, further comprising standards for calibrating a matrix-assisted laser desorption/ionization device.

30. A method of making a MALDI sample holder, said method comprising:

(a) applying a material that goes from a first fluid state to a second solid state in response to an applied stimulus to a substrate surface wherein said material is applied in the form of a fluid retaining structure precursor; and (b) exposing said material to a stimulus to produce a fluid retaining structure on said surface;

wherein said MALDI sample holder is configured for use in matrix-assisted laser desorption/ionization.

31. The method according to claim 30, wherein said substrate is a MALDI sample holder substrate.

32. The method according to claim 30, wherein said substrate is a non MALDI sample holder substrate and said method further comprises, following step (b), transferring said fluid retaining structure to a MALDI sample holder substrate.

33. The method according to claim 30, wherein said material is hydrophobic.

34. The method according to claim 30, wherein said material is a polymer.

35. The method according to claim 34, wherein said polymer is an elastomer.

36. The method according to claim 34, wherein said material is a fluoropolymer.

37. The method according to claim 30, wherein said stimulus is at least one of moisture, light, heat, and catalyst.

* * * * *